(12) United States Patent
Muglia et al.

(10) Patent No.: US 12,296,663 B2
(45) Date of Patent: May 13, 2025

(54) THERMOPLASTIC HARDTOP ROOF

(71) Applicant: Magna Exteriors Inc., Concord (CA)

(72) Inventors: John S. Muglia, Shelby Township, MI (US); Mohan Girijeshwar, Sterling Heights, MI (US); Keijo J. Huotari, Fenton, MI (US); Brian Staley, Bloomfield, MI (US); Larry Richard Erickson, Birmingham, MI (US); Marc Cogswell, Bloomfield Hills, MI (US); Robert M. Horner, Ferndale, MI (US); Luyao Zhu, Troy, MI (US)

(73) Assignee: MAGNA EXTERIORS, INC., Ontario, CA (US)

( * ) Notice: Subject to any disclaimer, the term of this patent is extended or adjusted under 35 U.S.C. 154(b) by 306 days.

(21) Appl. No.: 18/016,517

(22) PCT Filed: Jul. 21, 2021

(86) PCT No.: PCT/US2021/042483
§ 371 (c)(1),
(2) Date: Jan. 17, 2023

(87) PCT Pub. No.: WO2022/020420
PCT Pub. Date: Jan. 27, 2022

(65) Prior Publication Data
US 2023/0271487 A1    Aug. 31, 2023

Related U.S. Application Data

(60) Provisional application No. 63/054,722, filed on Jul. 21, 2020.

(51) Int. Cl.
B60J 7/10       (2006.01)
B60J 7/00       (2006.01)
(Continued)

(52) U.S. Cl.
CPC ............. B60J 7/106 (2013.01); B60J 7/0084 (2013.01); B60J 7/194 (2013.01); B60J 10/25 (2016.02); B60J 10/90 (2016.02); B62D 29/043 (2013.01)

(58) Field of Classification Search
CPC ....... B60J 7/11; B60J 7/16; B60J 7/106; B60J 7/1607; B60J 7/1628; B60J 7/1635;
(Continued)

(56) References Cited

U.S. PATENT DOCUMENTS

8,991,896 B1 *   3/2015   Whitehead ............... B60J 7/196
                                                              296/121
10,035,408 B2 *  7/2018   Crismon ................... B60J 7/11
(Continued)

*Primary Examiner* — Dennis H Pedder
(74) *Attorney, Agent, or Firm* — Warn Partners, P.C.

(57) ABSTRACT

The present invention is directed to a hardtop for a vehicle that has an exterior thermoplastic roof panel and sides. The hardtop includes a top frame formed of at least two longitudinal sides and at least one cross vehicle piece formed from fiber reinforced polymer. Connected to the top frame is at least one roof panel forming an outer surface of the hardtop. There are also one or more side frames each having a side panel connected thereto. The roof panel and side panel are all formed of thermoplastic, so it is possible to have a Class A finish paint surface or mold in color finish.

28 Claims, 13 Drawing Sheets

(51) Int. Cl.
  *B60J 7/19* (2006.01)
  *B60J 10/25* (2016.01)
  *B60J 10/90* (2016.01)
  *B62D 29/04* (2006.01)

(58) Field of Classification Search
  CPC ... B60J 7/1858; B60J 7/19; B60J 7/192; B60J 7/196; B60J 10/90
  USPC ......... 296/210, 218, 214, 102, 103, 10, 164, 296/163
  See application file for complete search history.

(56) References Cited

U.S. PATENT DOCUMENTS

2019/0092148 A1\* 3/2019 Rodriguez ............. B60J 1/1838
2022/0063384 A1\* 3/2022 Durham .................. B32B 27/40

\* cited by examiner

THERMOPLASTIC HARDTOP ROOF

CROSS-REFERENCE TO RELATED APPLICATIONS

This application is a PCT International Application and claims benefit of U.S. Provisional Patent Application No. 63/054,722, filed Jul. 21, 2020. The disclosure of the above application is incorporated herein by reference.

FIELD OF THE INVENTION

The present invention relates to a multi-piece thermoplastic hardtop roof for a vehicle.

BACKGROUND OF THE INVENTION

Removable hardtops for vehicles have been common place in the automotive industry for decades. Typical design requirements of hardtops require the top to have sufficient stiffness to serve as both the exterior roof of the passenger compartment and exterior surface of the vehicle. Current hardtop designs often use sheet molding compound (SMC) thermoset materials, which tend to provide a desired amount of stiffness. Using SMC compared to other materials such as thermoplastics has drawbacks. SMC typically has fiber reinforcements in the material to provide strength and stiffness to the hardtop, however, this affects the desired fit and finish of the hardtop making it difficult to achieve a class A finish. SMC also does not allow for the integration of additional features during the manufacturing process. Adding additional features is something that must take place during separate steps. Lastly SMC hardtops tend to be heavier than hardtops made from other components, which add extra weight that affects fuel economy and makes the hardtop difficult to remove.

It is an object of the invention to provide a hardtop that is made from thermoplastic, which is lighter and can be colored in the mold or can be painted to have a class A finish. Secondly it is an object of the invention to provide a thermoplastic hardtop that allows for the integration of additional features, which can be connected to the thermoplastic hardtop during the forming process.

SUMMARY OF THE INVENTION

The present invention is directed to a hardtop for a vehicle that has an exterior thermoplastic roof panel, sides, and rear. The hardtop includes a top frame formed of at least two longitudinal sides and at least one cross vehicle piece formed from fiber reinforced polymer. Connected to the top frame is at least one roof panel forming an outer surface of the hardtop. The at least one roof panel is formed of thermoplastic, so it is possible to have a Class A finish painted surface or mold-in-color finish.

The hardtop also includes a plurality of side frames having at least one longitudinal top side and two laterally extending sides that extend perpendicular to the at least one longitudinal top side in a downward direction away from the at least one roof panel. The plurality of side frames are connectable to the top frame and are formed from fiber reinforced thermoplastic material. There is further provided at least one side connected to a respective one of the plurality of side frames, wherein the at least one side is formed of thermoplastic material and forms an exterior side of the hardtop. The exterior side is formed of thermoplastic, so it is also possible to have a Class A finish painted surface or mold in color finish.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
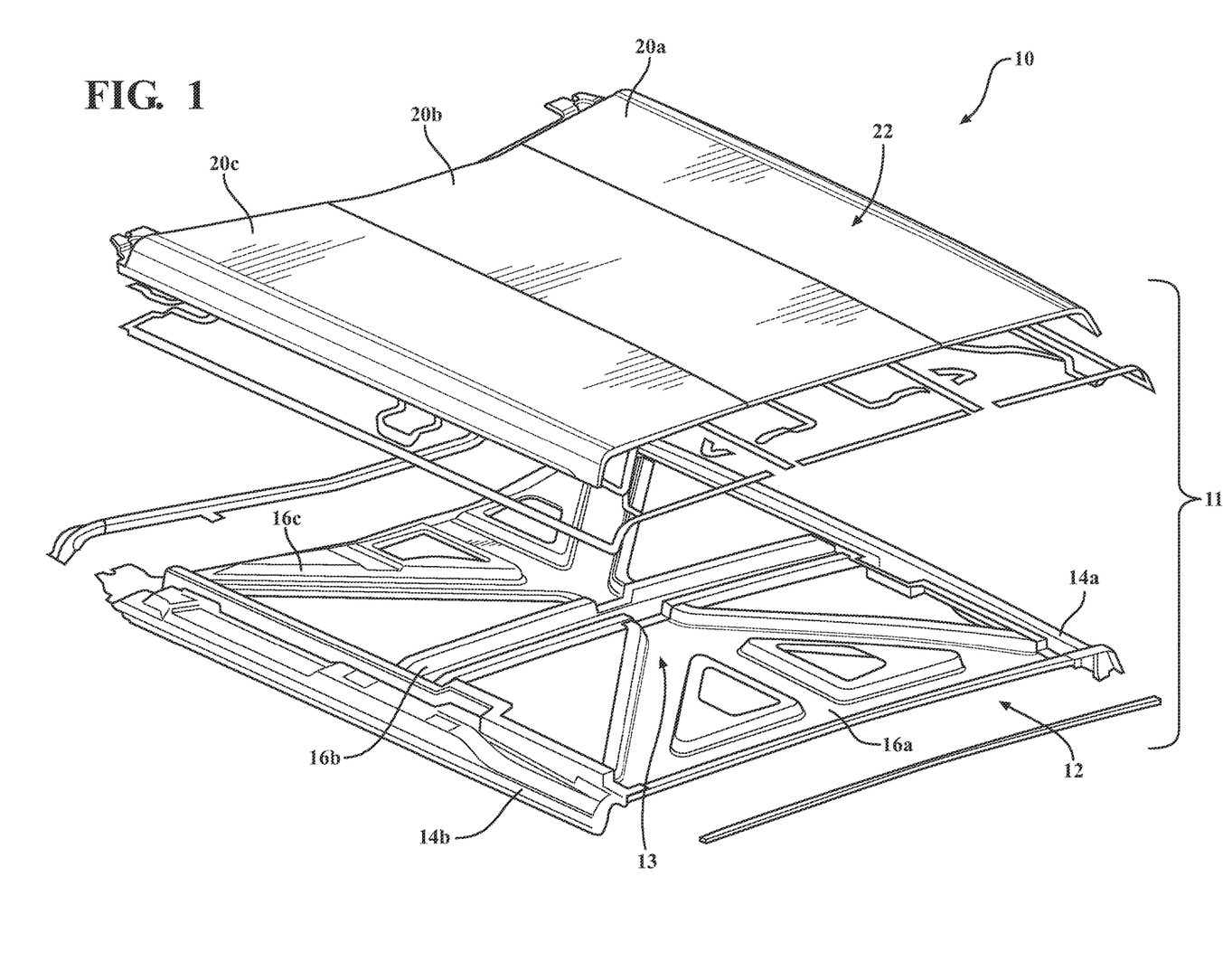
FIG. 1 is an exploded side perspective view of a top portion of a hardtop according to one embodiment of the invention.

FIG. 7A-7D depicts to different embodiments of a hardtop 10, 100 for a vehicle. The hardtop 10, 100 is typically for a type of vehicle where the hardtop is removable. The hardtop 10, 100 has a roof 11, 111 that includes a top frame 12 and each embodiment differs in that hardtop 10 has three roof panels 20a, 20b, 20c; while hard top 100 has two roof panels 120a, 120b. Both hardtop 10 and hardtop 100 include a top frame 12. Referring now to FIG. 1 greater details of the roof 11 of hardtop 10 are shown. Roof 11 includes top frame 12 are shown with reference to hardtop 10. The top frame 12 is formed of two longitudinal sides 14a, 14b and several cross vehicle pieces 16a, 16b, 16c. The top frame 12 can be formed of a single integrated piece, or by several pieces connected together. The two longitudinal sides 14a, 14b and the cross vehicle pieces 16a, 16b, 16c are formed from fiber reinforced polymer. However, in the present exemplary embodiment of the invention the polymer is a polypropylene with a glass fiber content of about 40%. It is also within the scope of this invention for the top frame 12 and to have different fiber contents for different parts of the frame. Additionally, it is possible for the side frames (described below) to have a different fiber content than the top frame 12.

Figure 2:
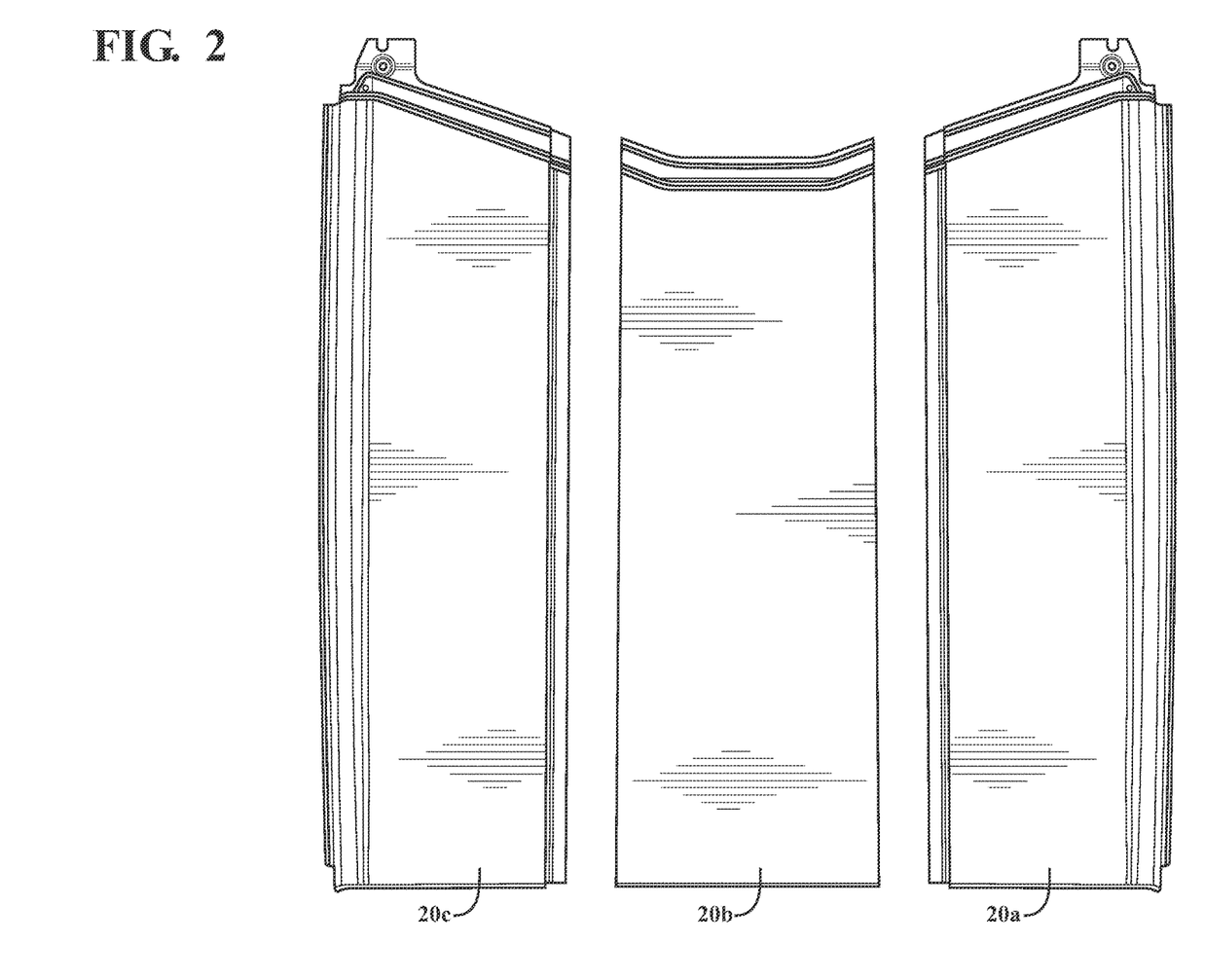
FIG. 2 is a top plan view of roof panels according to one embodiment of the invention.
Figure 3:
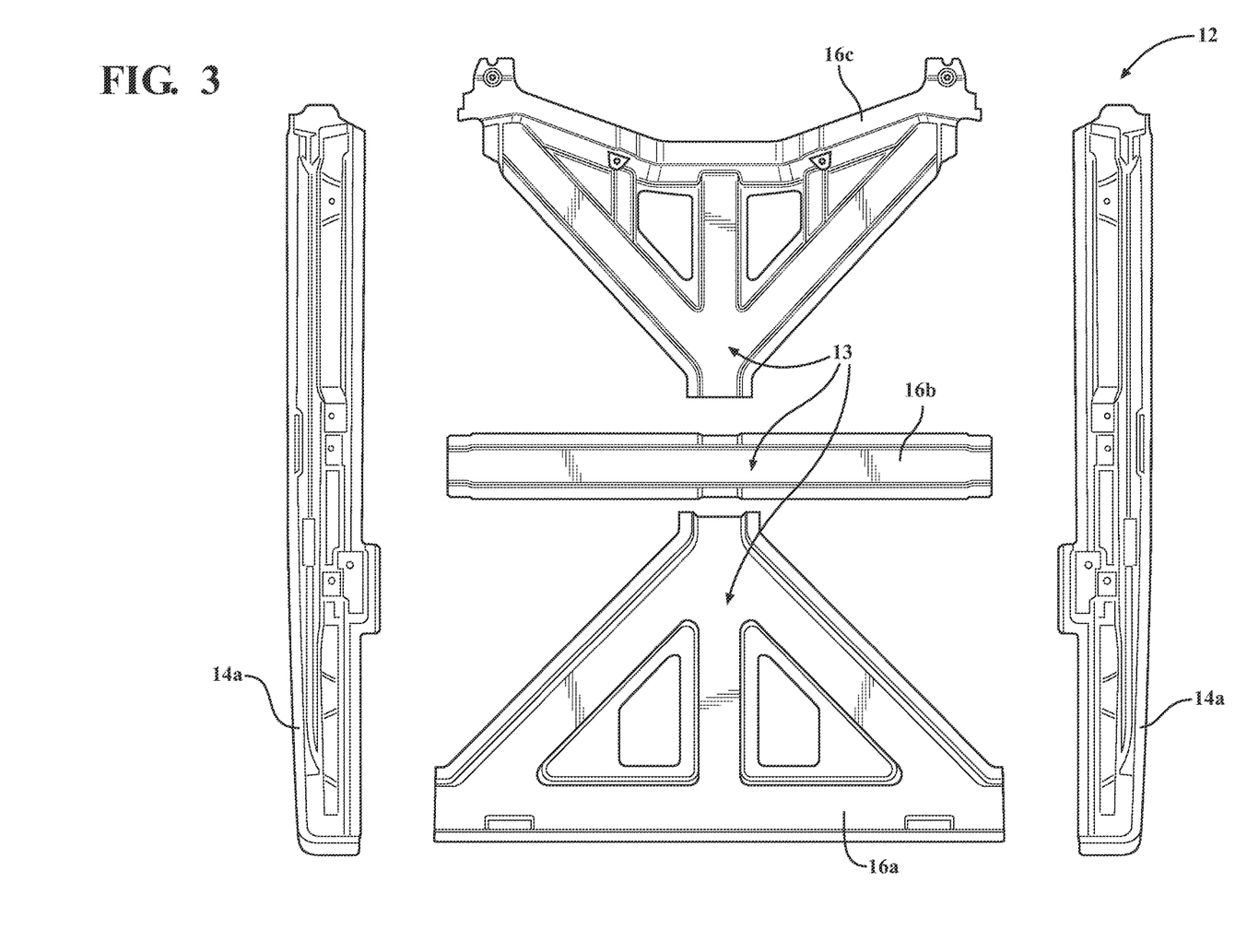
FIG. 3 is a top plan exploded view of a top frame according to one embodiment of the invention.

Referring now to FIGS. 1-3 the hardtop 10 further includes roof panels 20a, 20b, 20c connected to the top frame 12. While three roof panels are shown, it is within the scope of the invention for a greater or lesser number of roof panels to be implemented depending on the needs of a particular application. The roof panels 20a, 20b, 20c form an outer surface 22 or exterior surface of the hardtop 10. The roof panels 20a, 20b, 20c have at least two adjacent panels connected together at a seam 24, wherein the seam 24 includes an inner portion 26 of one of the roof panels nested together with an outer portion 28 of the other one of the at least two adjacent panels. The roof panels 20a, 20b, 20c are formed of virgin polymer and form the outside surface 22 of the hardtop. The roof panels 20a, 20b, 20c are also characterized as being formed of thermoplastic material that is a polymer without fiber reinforcement material. In the present embodiment of the invention the roof panels 20a, 20b, 20c are formed of thermoplastic olefin. The roof panels 20a, 20b, 20c are connected to the top frame 12 using different connection mechanisms depending on the needs of a particular application. Specific connection mechanisms include but are not limited to adhesives, ultrasonic welding, and mechanical fasteners The top frame 12 can also include additional features molded therein such as handles, garment hooks, light outlets, power, outlets, etc. The top frame 12 is also formed to include ducts that can be used for several purposes such as air flow ducts 13 with vents, wiring harnesses, speakers, and electrical connectors. Additionally, it is within the scope of this invention to provide water tubes or ducts within the top frame 12.

Figure 4:
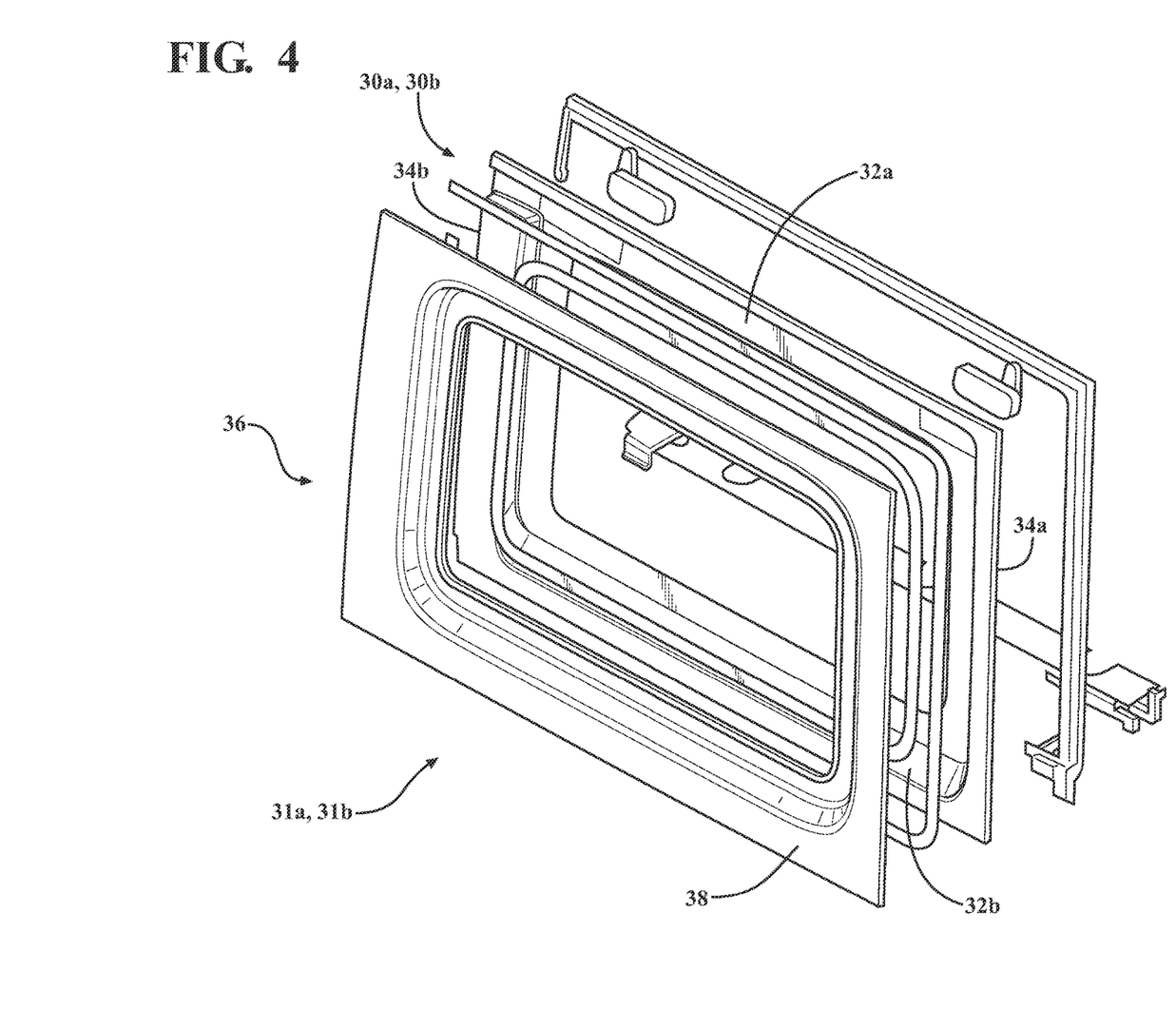
FIG. 4 is an exploded side perspective view of the side structure of the hardtop according to one embodiment of the invention.
Figure 7A:
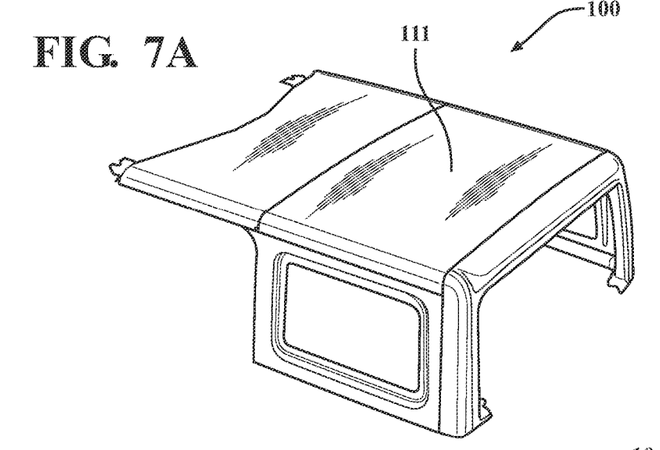
FIG. 7A is a top side perspective view of a two piece top panel according to one embodiment of the invention.
Figure 7B:
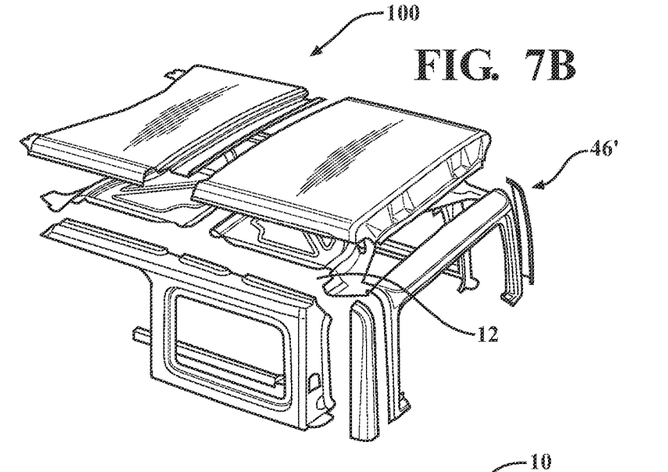
FIG. 7B is an exploded top side perspective view of a two piece top panel according to one embodiment of the invention.
Figure 7C:
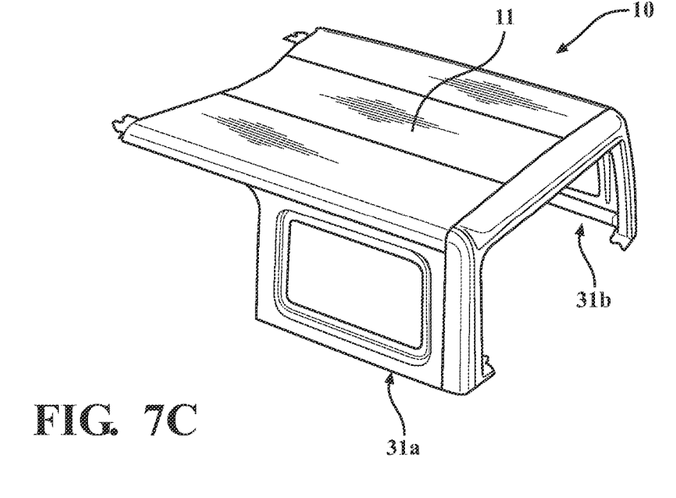
FIG. 7C is a top side perspective view of a three piece top panel according to one embodiment of the invention.
Figure 7D:
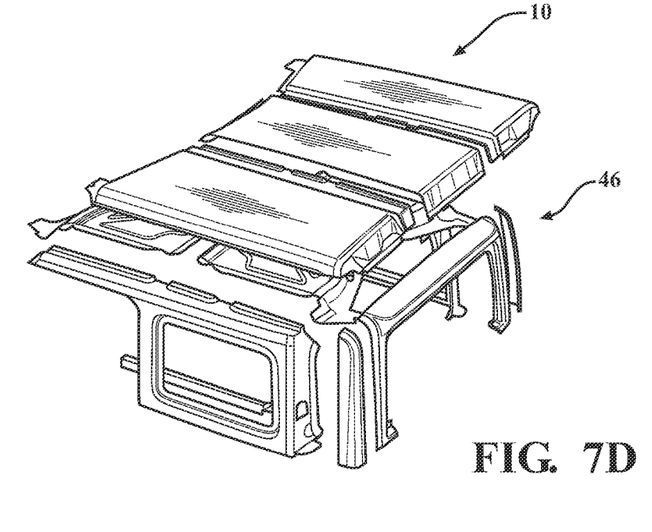
FIG. 7D is an exploded top side perspective view of a three piece top panel according to one embodiment of the invention.

Referring now to FIGS. 4 and 7C the hardtop 10 has a left side 31a and a right side 31b that each include a side frame 30a, 30b which are shown as a left side frame and right side frame part of a left side 31a and right side 31b of the hardtop 10, as show in in FIGS. 4 and 7C. It is also possible for there to be additional side frames on the left side, right side connected together or a rear side frame of the hardtop 10. Each side frame 30a, 30b has at least one longitudinal top side 32a, a longitudinal bottom side 32b and two laterally extending sides 34a, 34b that extend downward away from the plurality of roof panels 20a, 20b, 20c in a perpendicular direction between the longitudinal top side 32a and the longitudinal bottom side 32b. The side frames 30a, 30b are connectable to the top frame 12. The side frames 30a, 30b in a preferred embodiment of the invention are formed of a polymer with fiber reinforcements. More specifically in the present embodiment of the invention the side frames 30a, 30b are formed of polypropylene resin with reinforcing fibers being one of glass fibers or carbon fibers. In the present exemplary embodiment of the invention the polymer is a polypropylene with a glass fiber content of about 40%. Connected to the two side frames 30a, 30b is a side outer panel 36 connected to a respective one of the plurality of side frames 30a, 30a. The side outer panel 36 is formed of virgin polymer and forms an exterior side of the hardtop. The side outer panel 36 is also characterized as being formed of thermoplastic material that is a polymer without fiber reinforcement material. In the present embodiment of the invention the side outer panel 36 is formed of thermoplastic olefin. The side outer panel 36 is connected to one of the side frames 30a, 30b using several different mechanisms, including adhesives, ultrasonic welding, and mechanical fasteners.

Figure 5A:
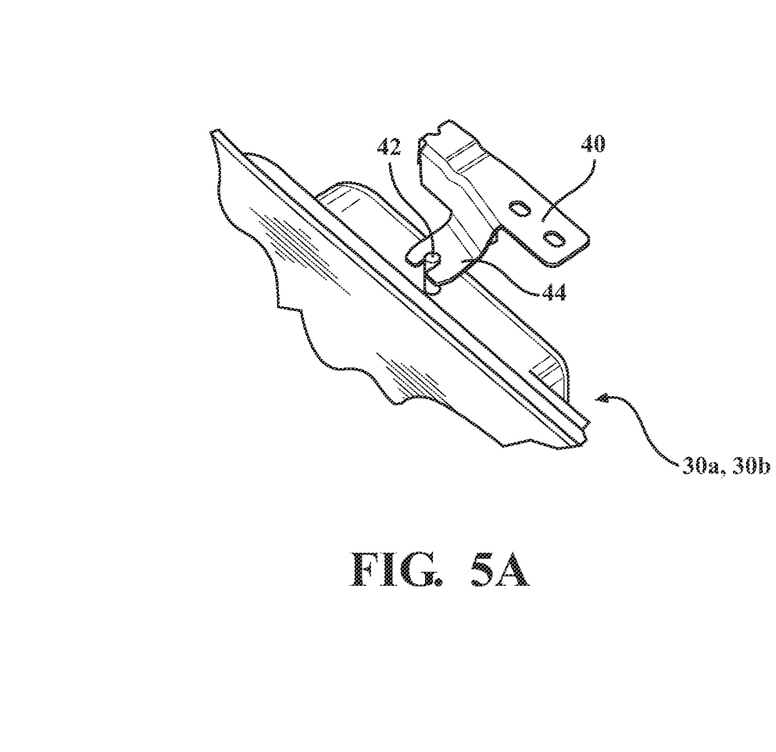
FIG. 5A is an enlarged top perspective view of a locator tab according to one embodiment of the invention.
Figure 5B:
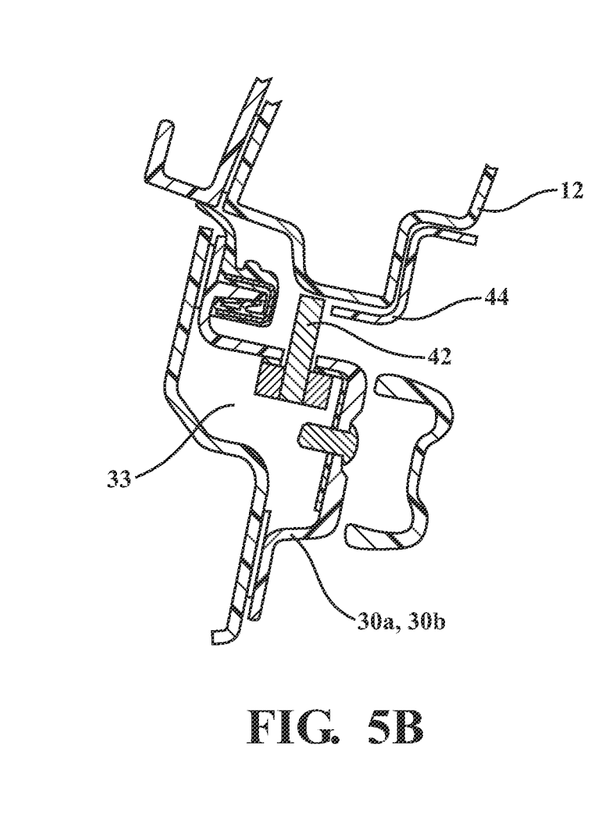
FIG. 5B is a cross-sectional enlarged side view of the locator tab in contact with a side panel.

The side frames 30a, 30b are aligned and connected with the top frame 12 using a locator tab 40 that contacts a pin 42 at a lock 44, the details of which are depicted in FIGS. 5A-5B, which show an example of one connection between the side frames 30a, 30B and top frame 12. The lock 44 is depicted as being a channel formed in the locator tab 40 that the pin 42 slides into. While a single connection is shown it is within the scope of the invention for a greater number of locator tabs and pins to be used depending on the size and design of a particular application. The pin 42 aligns with the lock 44 locator tab 40 and functions to ensure proper alignment of the side frame 30a, 30b and the top frame 12. The locator tab 40 is depicted as being a bracket that is connected to the top frame 12 and the pin 42 is depicted as being a metal pin that is connected to the side frame 30a, 30b. However, it is within the scope of this invention for the locator tab 40 and pin 42 to be molded into the respective top frame 12 or side frame 30a, 30b. Also, it is within the scope of this invention for additional locator tabs and pins to be implemented. It is within the scope of the invention for the locator tab 40 to be located on the side frame 30a, 30b and the pin 42 to be located on the top frame 12 depending on the needs of a particular application.

Just like the top frame 12, the side frame 30a, 30b can also include additional features molded therein. Such features including, but not limited to handles, garment hooks, light outlets, power, outlets, etc. The side frame 30a, 30b is also formed to include ducts 33 that can be used for several purposes such as air flow ducts with vents, wiring harnesses, speakers, and electrical connectors.

Figure 6:
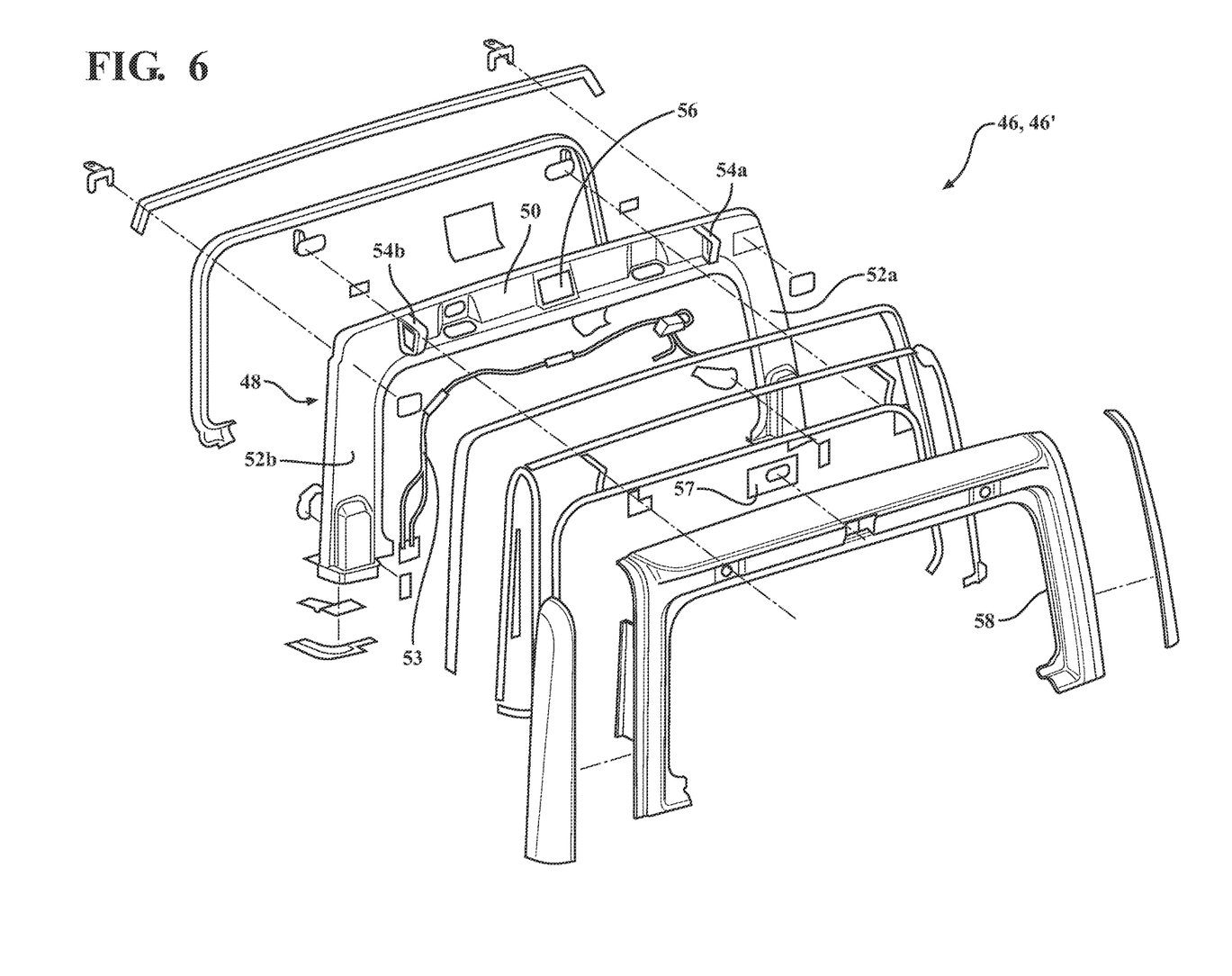
FIG. 6 is an exploded rear view of a rear aperture assembly according to one embodiment of the invention.

The hardtop 10, 100 as shown in FIGS. 7A-7D also include a rear aperture assembly 46, 46' that extends between the respective left side 31a, right side 31b, and roof 11, 111. The rear aperture assembly 46, 46' includes a rear frame 48 with a top side 50 extending between two longitudinal sides 52a, 52b. Referring now to FIG. 6 the rear frame 48 further includes a molded bracket 54a, 54b that provides support to a rear panel 58 that forms an exterior surface of the rear side of the vehicle. The molded bracket 54a, 54b is two structures but it is within the scope of the invention for there to be a greater or lesser number of molded brackets to be implemented depending on the needs of a particular application. Additionally, the molded brackets 54a, 54b also serve as brackets for additional structures 53, such as wiring harnesses, washer fluid hoses or other structures.

The rear frame 48 is formed of polymer with fiber reinforcements. More specifically in the present embodiment of the invention the rear frame 48 is formed of polypropylene resin with reinforcing fibers being one of glass fibers or carbon fibers. In the present exemplary embodiment of the invention the polymer with fibers is a polypropylene with a glass fiber content of about 40%. The rear panel 58 is formed of a virgin polymer material that can have a class A finish painted thereon or be molded in color. One exemplary material useable for the rear panel 58 is thermoplastic olefin material.

The rear frame further includes other features that can be molded thereon or connected to the rear frame 48. For example, the rear frame 48 includes a rear camera bracket 56 that is used to support the mounting of a rear camera 57 to the rear aperture assembly 46, 46'. Also, other features such as hinge brackets or strut support brackets can be connected to or molded into the rear frame 48.

Figure 8A:
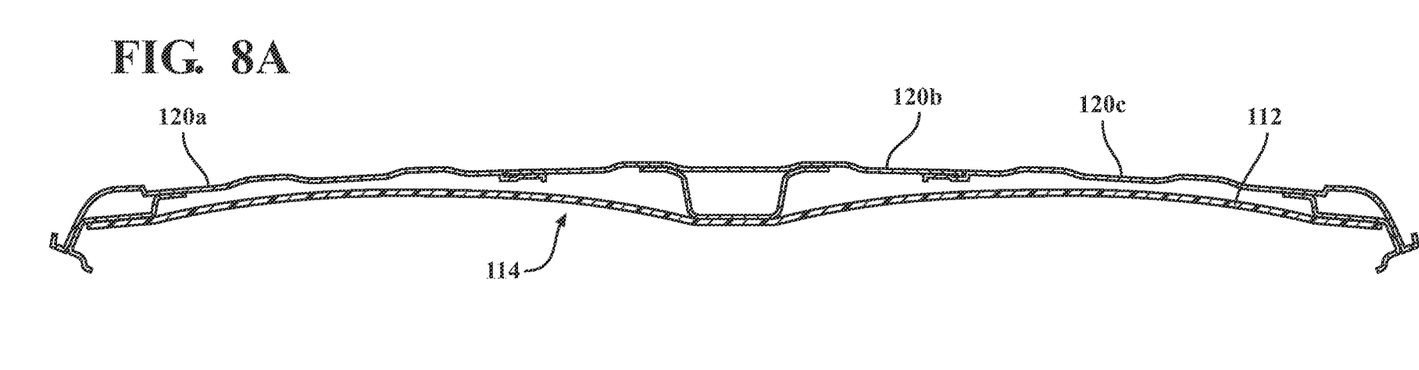
FIG. 8A is a cross sectional elevational view of another embodiment of the invention.
Figure 8B:
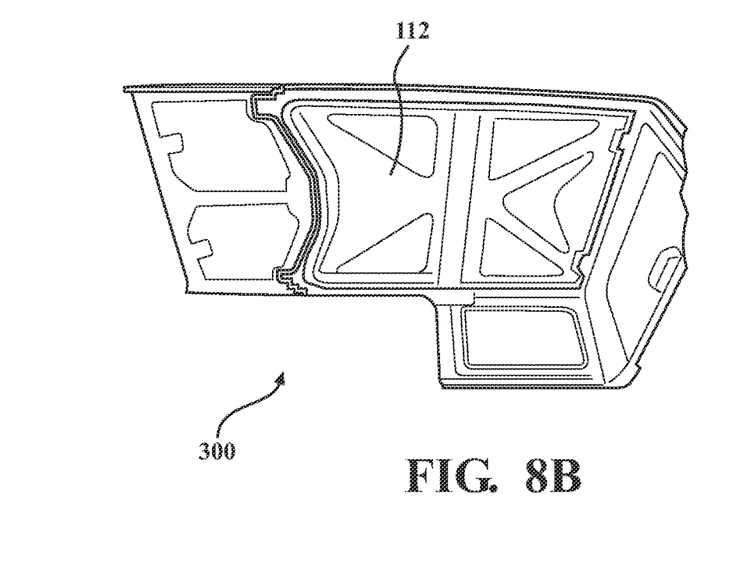
FIG. 8B is a bottom perspective view of one embodiment of the invention.
Figure 8C:
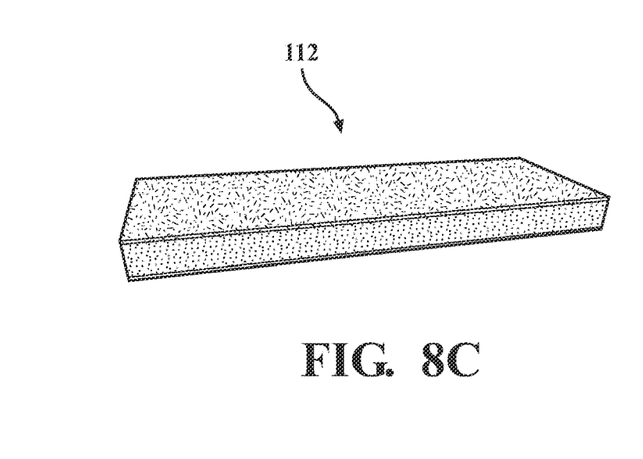
FIG. 8C a cross-sectional side perspective view of a portion of the structural material used in one embodiment of the invention.

Referring now to FIGS. 8a-8C another embodiment of the invention, a hardtop 300 is depicted that does not have the top frame 12 as shown In FIGS. 1 and 7A-7D. In this embodiment of the invention the hardtop 300 includes a structural headliner 112 formed of structural polymer and extending across a ceiling of a vehicle passenger compartment. The structural headliner 112 is molded and forms an interior surface 114 of the vehicle passenger compartment, while also providing a fiber reinforced polymer surface having enough strength to allow mounting of the roof panels 120a, 120b, 120c.

Figure 13:
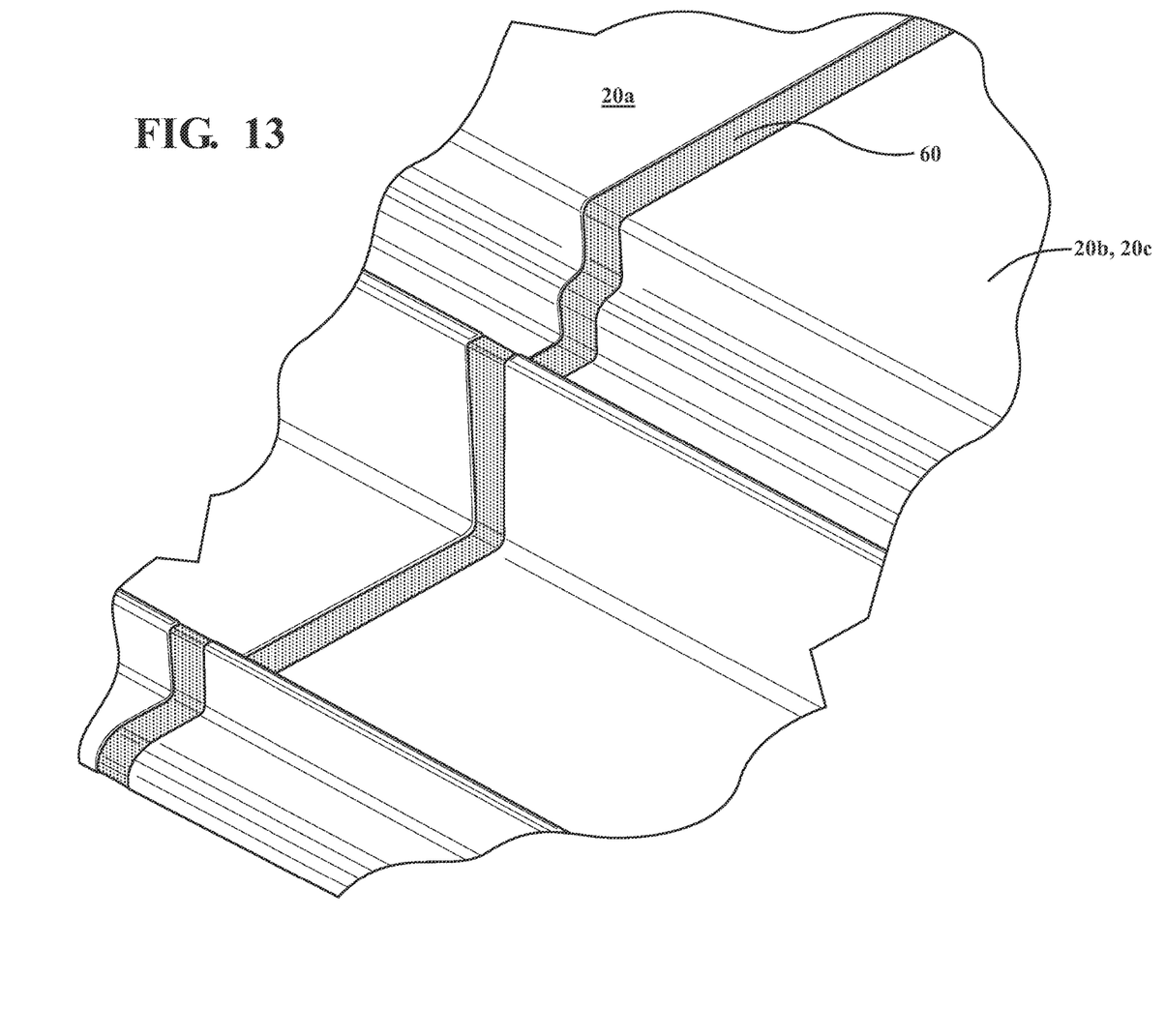
FIG. 13 is an enlarged top perspective view of a water management embodiment of the invention using a seam sealer.

Referring now to FIG. 13 another aspect of the hardtop 10 includes the water management features between roof panel 20a and roof panel 20b, 20c as schematically shown. When connecting the roof panels 20a, 20b, 20c together it is important to avoid having water intrude underneath the roof panels 20a, 20b, 20c. It is also important to avoid having water enter in the region between the roof panels 20a, 20b, 20c and the left side 31a, right side 31b or rear aperture assembly 46, 46' (shown in FIGS. 1-7D). In one embodiment of the invention a seam sealer 60 is placed into the area of a first roof panel 20a that meets a second roof panel 20b, 20c, in order to prevent water from intruding between the two panels. The seam sealer can be silicone, rubber or some type of curable adhesive that provides a water tight barrier.

Figure 9:
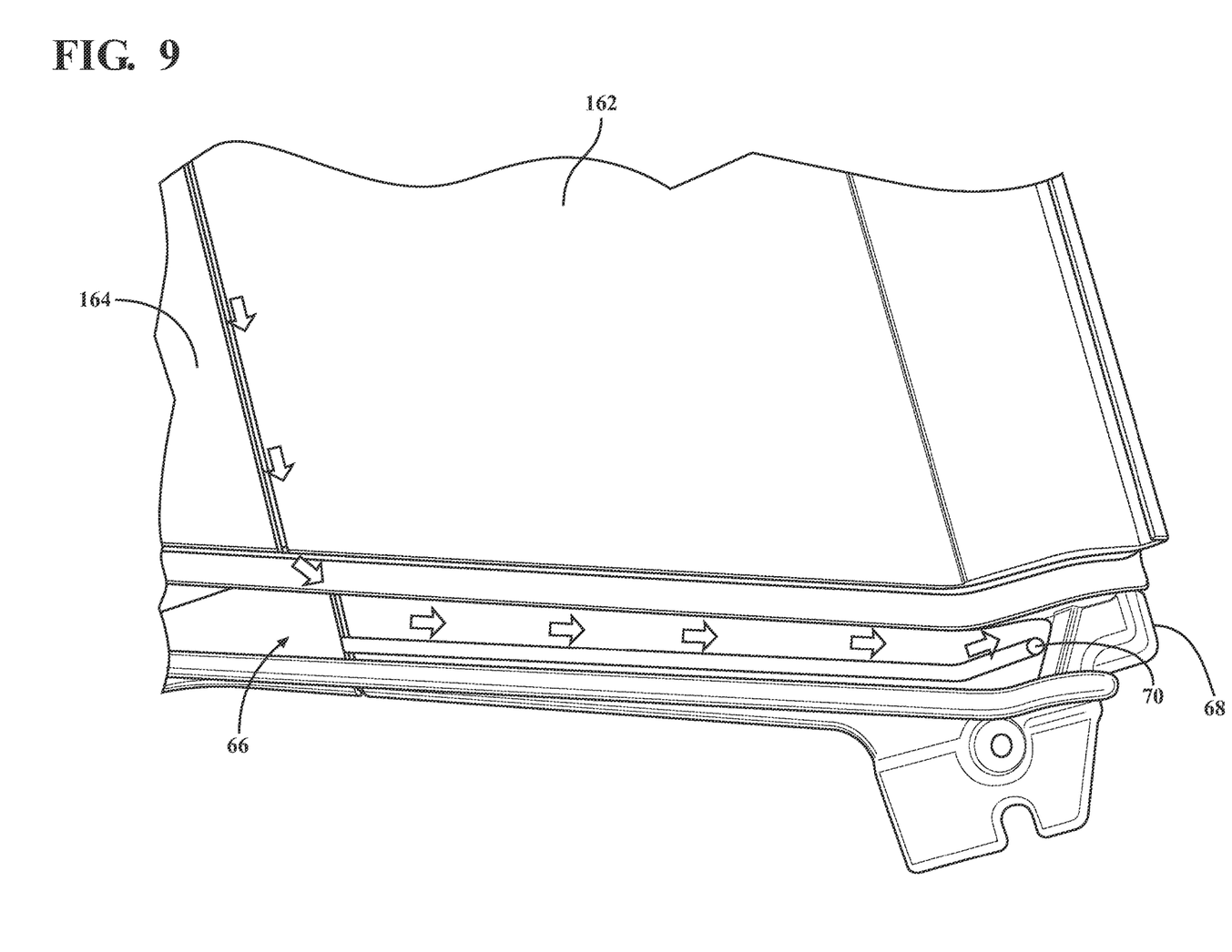
FIG. 9 is an enlarged top perspective view of a water trough feature according to a one embodiment of the invention.

FIG. 9 depicts another water management feature that includes a water trough 66 that extends across a first roof panel 162 and a second roof panel 164. The water trough 66 is an integrated sloped low point on the surface of the first roof panel 162 and the second roof panel 164 that directs water to a chute 68 formed in the water trough 66 at one end, which can also include a drain 70 where water is removed from the water trough 66, either through the drain 70 or by falling out of the chute 68.

Figures 10A, 10B, 10C:
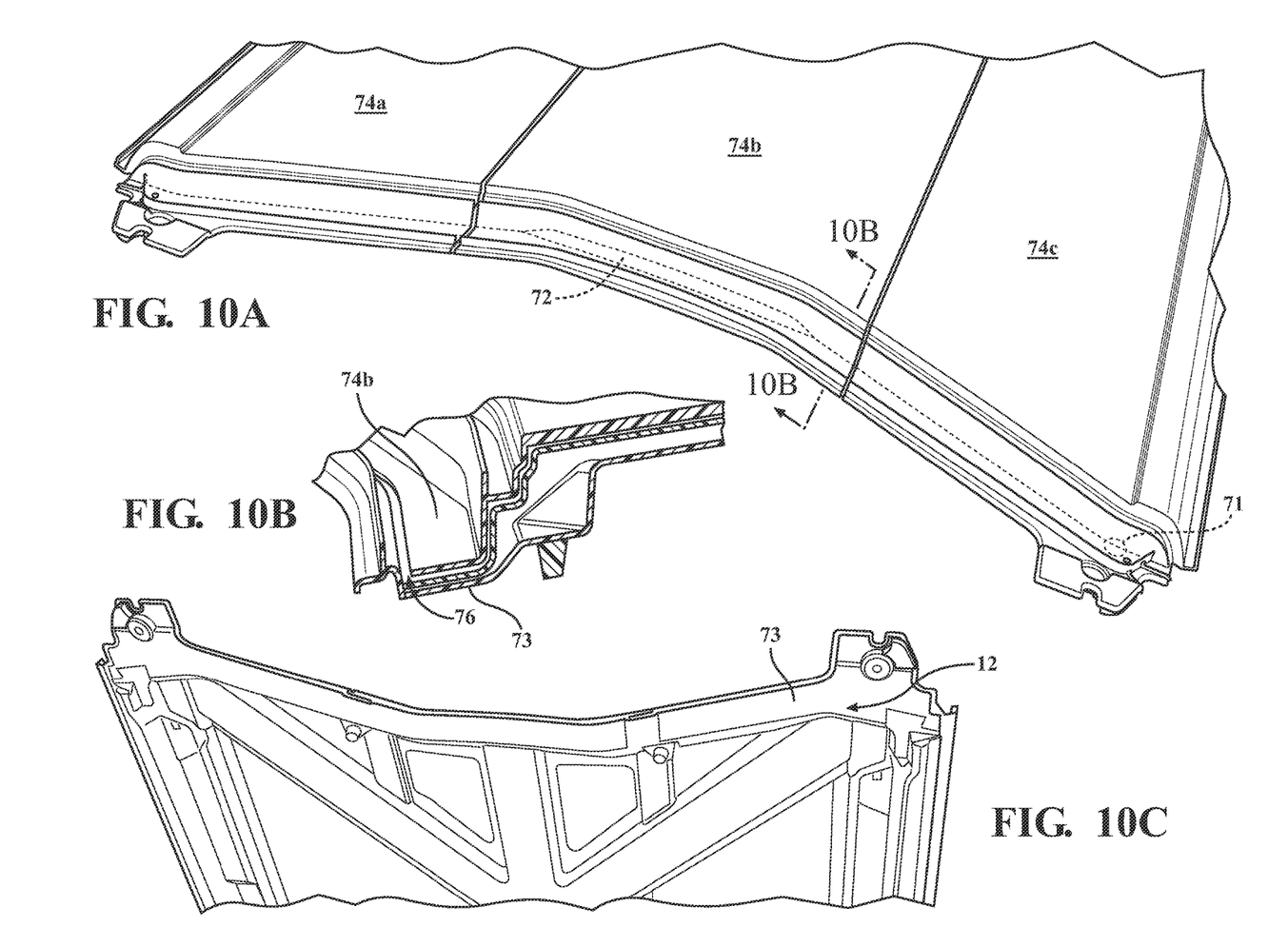
FIG. 10A is an enlarged top perspective view and enlarged bottom perspective view of a water trough feature according to one embodiment of the invention.
FIG. 10B is an enlarged cross-sectional view of the water trough feature of FIG. 10A.
FIG. 10C is a partial cross-sectional bottom view of the water trough feature shown in FIG. 10A.

FIGS. 10A, 10B, and 10C depict another variation of the water trough 66 show in FIG. 9, where FIG. 10A uses a water trough 72 that is formed in a top frame 73, where roof panels 74a, 74b, 74c have an opening 76 or passage to the water trough 72. The opening 76 is formed by roof panels 74a, 74b, 74c ending before the boundary of the top frame 73. The water trough 72 is a sloped surface that directs water to an outlet 71 or other desired location.

Figure 11A:
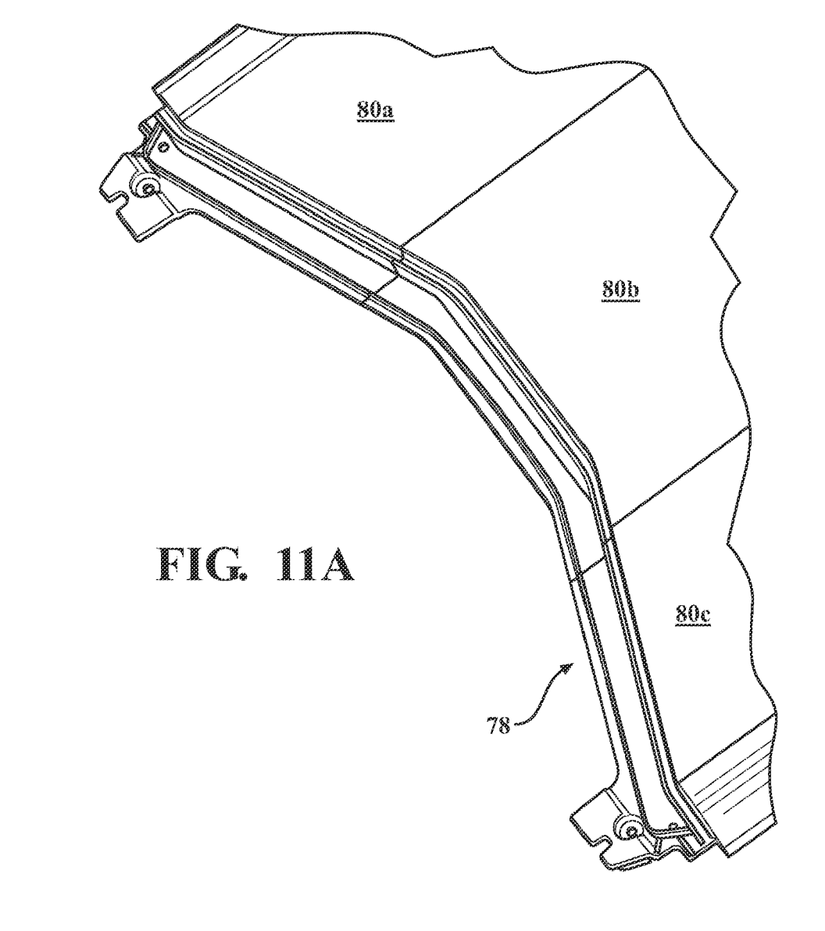
FIG. 11A is an enlarged top perspective view of a single piece molded trough connected to the roof panels according to another embodiment of the invention.
Figure 11B:
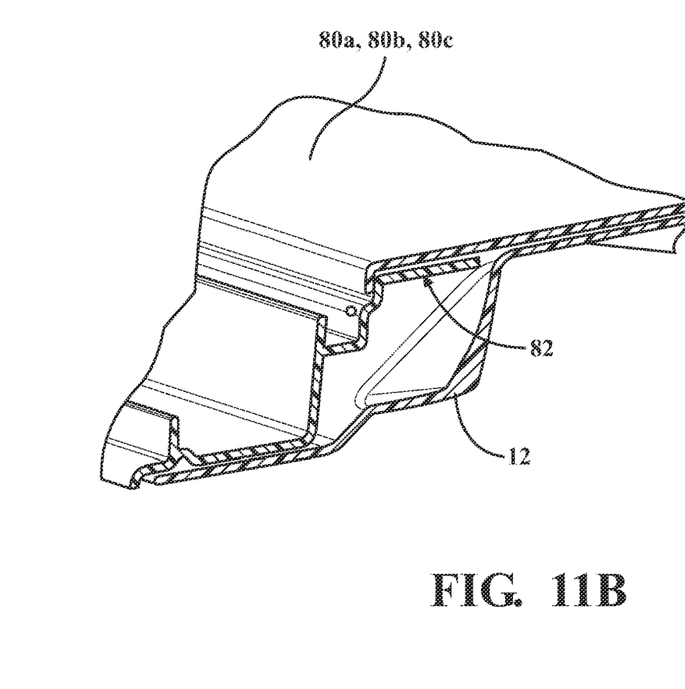
FIG. 11B is an enlarged side cross-sectional perspective view of a single piece molded trough connected to the roof panels according to another embodiment of the invention.

Referring now to FIGS. 11A and 11B another variation of the water management feature is shown and described. As shown, there is a trough 78 that single piece molded component that is connected to three roof panels 80a, 80b, 80c using a lap joint 82. This eliminates any seams in the trough 78.

Figure 12:
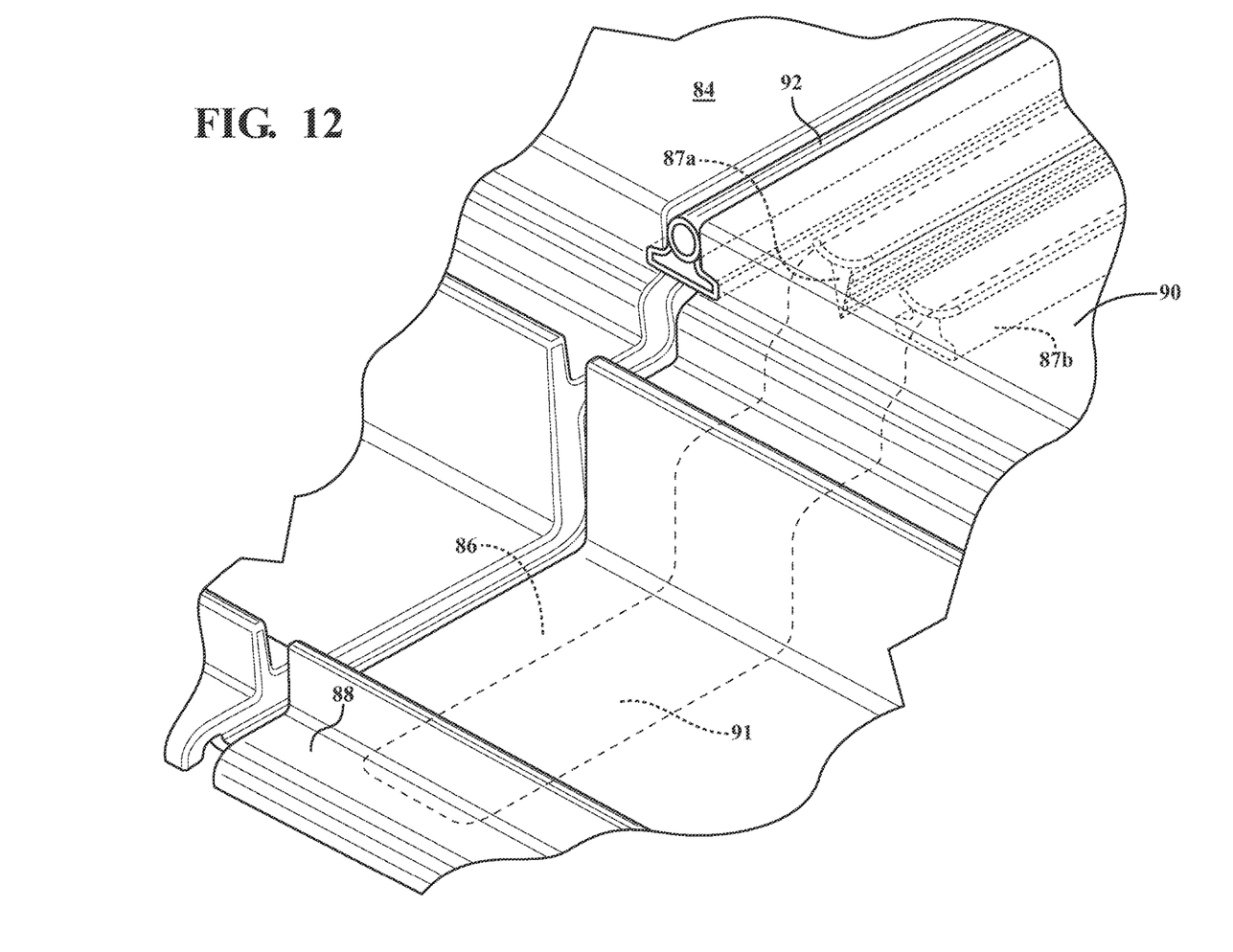
FIG. 12 is an enlarged top perspective view of a gap management arrangement according to a sixth embodiment of the invention.

Referring now to FIG. 12 there is another embodiment of the invention pertaining to a water management feature of the invention. There is a first roof panel 84 with an undercut 86 that is positioned under an overcut 88 of a second roof panel 90. Between a top surface of the undercut 86 and a bottom surface of the overcut 88 is an inside gap seal 87a, which has an elastomeric seal with a V-shaped cross section. Alternatively shown is an inside gap seal 87b which is has and I-shaped cross section that had a contact surface that is wider than the cap seal 87a. There is also an outside gap seal 92 located between the first roof panel 84 and the second roof panel 90 at a location where the first roof panel 84 meets the second roof panel 90 meet on the exterior surface. The outside gap seal 92 can be made out of any material including an elastomeric seal element. In another alternate aspect of the present invention there is a bond joint 91 between the overcut 88 and the undercut 86 that is created by using welding or adhesive bonding.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A removable hardtop for a vehicle comprising:
a roof, a separate left side, and a separate right side of a hardtop for a vehicle that is removable from the vehicle;
the roof includes a top frame formed of at least two longitudinal sides and at least one cross vehicle piece, wherein the at least two longitudinal sides and the at least one cross vehicle piece are formed from fiber reinforced polymer;
at least one roof panel forming an outer surface of the roof of the hardtop and formed of thermoplastic material connected to the top frame;
the left side includes a left side frame formed of fiber reinforced thermoplastic material, the left side frame includes at least one longitudinal top side and two laterally extending sides that extend perpendicular to the at least one longitudinal top side in a downward direction away from the at least one roof panel, wherein the left side frame is connected to the top frame at a connection,
the right side includes a right side frame formed of fiber reinforced thermoplastic material, the right side frame includes at least one longitudinal top side and two laterally extending sides that extend perpendicular to the at least one longitudinal top side in a downward direction away from the at least one roof panel, wherein the right side frame is connected to the top frame at a connection, and
a side panel connected to each of the left side frame and the right side frame, wherein each side panel is formed of thermoplastic material and forms an exterior side of the separate left side and an exterior side of the separate right side of the hardtop.

2. The hardtop for the vehicle of claim 1 wherein the fiber reinforced thermoplastic material of the top frame, the left side frame and the right side frame are polypropylene resin with reinforcing fibers being one of glass fibers or carbon fibers.

3. The hardtop for the vehicle of claim 1 wherein the at least one roof panel, the side panel of the separate left side and the side panel of the separate right side are formed of thermoplastic material that is a virgin polymer.

4. The hardtop for the vehicle of claim 1 wherein the at least one roof panel, the side panel of the separate left side and the side panel of the separate right side are formed of thermoplastic material that is a polymer without fiber reinforcement material.

5. The hardtop for the vehicle of claim 1 wherein the top frame and the left side frame and the right side frame each have one or more ducts.

6. The hardtop for the vehicle of claim 1 wherein the connection of the left side frame to the top frame and the connection of the right side frame to the top frame further includes at least one locator tab on the top frame that contacts and locks onto a pin extending from the right side frame and the left side frame, respectively.

7. The hardtop for the vehicle of claim 1 further comprising:
a rear aperture assembly that extends between the separate left side, the separate right side, and the roof, wherein the rear aperture assembly includes a rear frame with a top side extending between two longitudinal sides, wherein the rear frame further includes one or more molded brackets that provide support to a rear panel that forms an exterior surface of a rear side of the hardtop for the vehicle.

8. The hardtop for the vehicle of claim 7 wherein the one or more molded brackets serve as brackets for additional structures.

9. The hardtop for the vehicle of claim 1 further comprising a water trough formed in the top frame and an opening is formed by the at least one roof panel ending before a boundary of the top frame, wherein the water trough is a sloped surface that direct water to an outlet.

10. A hardtop for a vehicle comprising:
a roof, a separate left side, and a separate right side of a hardtop for a vehicle that is removable from the vehicle;
the roof includes a top frame formed of at least two longitudinal sides and at least one cross vehicle piece, wherein the at least two longitudinal sides and the at least one cross vehicle piece are formed from fiber reinforced polymer;
a plurality of roof panels connected to the top frame and forming an outer surface of the roof, the plurality of roof panels form an outer surface of the hardtop, wherein the plurality of roof panels have at least two adjacent panels connected together at a seam, wherein the seam includes an inner portion of one of the at least two adjacent panels nested together with an outer portion of the other one of the at least two adjacent panels;
the separate left side includes a left side frame formed of fiber reinforced thermoplastic material, the left side frame includes at least one longitudinal top side and two laterally extending sides that extend perpendicular to the at least one longitudinal top side in a downward direction away from the at least one roof panel of the plurality of roof panels, wherein the left side frame is connected to the top frame at a connection,
the separate right side includes a right side frame formed of fiber reinforced thermoplastic material, the right side frame includes at least one longitudinal top side and two laterally extending sides that extend perpendicular to the at least one longitudinal top side in a downward direction away from the at least one roof panel of the plurality of roof panels, wherein the right side frame is connected to the top frame at a connection, and
a side panel connected to each of the left side frame and the right side frame, wherein each side panel is formed of thermoplastic material and forms an exterior side of the separate left side and an exterior side of the separate right side of the hardtop.

11. The hardtop for the vehicle of claim 10 wherein the fiber reinforced thermoplastic material of the top frame and the left side frame and the right side frame are a polypropylene resin with reinforcing fibers being one of glass fibers or carbon fibers.

12. The hardtop for the vehicle of claim 10 wherein the plurality of roof panels and the side panel of the separate left side and the side panel of the separate right side are formed of thermoplastic material that is a virgin polymer.

13. The hardtop for the vehicle of claim 10 wherein the plurality of roof panels and the side panel of the separate left side and the side panel of the separate right side are formed of thermoplastic material that is a polymer without fiber reinforcement material.

14. The hardtop for the vehicle of claim 10 wherein the top frame, left side frame and the right side frame each have one or more ducts.

15. The hardtop for the vehicle of claim 10 wherein the connection of the left side frame to the top frame and the connection of the right side frame to the top frame further includes at least one locator tab on the top frame that contacts and locks onto a pin extending from the right side frame and the left side frame, respectively.

16. The hardtop for the vehicle of claim 10 further comprising:
a rear aperture assembly that extends between the separate left side, the separate right side, and the roof, wherein the rear aperture assembly includes a rear frame with a top side extending between two longitudinal sides, wherein the rear frame further includes one or more molded brackets that provide support to a rear panel that forms an exterior surface of a rear side of the hardtop for the vehicle.

17. The hardtop for the vehicle of claim 16 wherein the one or more molded brackets serve as brackets for additional structures.

18. The hardtop for the vehicle of claim 10 further comprising a water trough formed in the top frame and an opening is formed by the plurality of roof panels ending before a boundary of the top frame, wherein the water trough is a sloped surface that direct water to an outlet.

19. The hardtop for the vehicle of claim 10 further comprising a water trough that extends across the at least two adjacent panels of the plurality of roof panels, wherein the water trough is an integrated sloped low point in a surface of the at least two adjacent panels that directs water to a chute formed in the water trough.

20. The hardtop for the vehicle of claim 10 further comprising a water trough formed of a single piece molded component that is connected to the plurality of roof panels at a lap joint.

21. The hardtop for the vehicle of claim 10 wherein a first of the two adjacent panels has an undercut that is positioned under an overcut of a second of the two adjacent panels and an inside gap seal positioned between the top surface of the undercut and a bottom surface of the overcut thereby creating a water resistant seal between the two adjacent panels.

22. A hardtop for a vehicle comprising:
   a roof, a separate left side, and a separate right side of a hardtop for a vehicle that is removable from the vehicle;
   a portion of the roof includes a structural headliner formed of structural polymer and extending across a ceiling of a vehicle passenger compartment and forming an interior surface of the vehicle passenger compartment, wherein the structural headliner is formed from fiber reinforced polymer;
   the roof further includes at least one roof panel formed of thermoplastic material connected to the structural headliner;
   the separate left side includes a left side frame and the separate right side includes a right side frame, the left side frame and the right side frame each include having at least one longitudinal top side and two laterally extending sides that extend perpendicular to the at least one longitudinal top side in a downward direction away from the at least one roof panel, wherein the left side frame and right side frame are connectable to the structural headliner and are formed from fiber reinforced thermoplastic material, and
   a side panel connected to each of the left side frame and the right side frame, wherein each side panel is formed of thermoplastic material and forms an exterior side of the hardtop.

23. The hardtop for the vehicle of claim 22 wherein the roof, the side panel of the separate left side and the side panel of the separate right side are formed of thermoplastic material that is a virgin polymer.

24. The hardtop for the vehicle of claim 22 wherein the roof, the side panel of the separate left side and the side panel of the separate right side are formed of thermoplastic material that is a polymer without fiber reinforcement material.

25. The hardtop for the vehicle of claim 22 further comprising:
   a rear aperture assembly that extends between the separate left side, the separate right side, and the roof, wherein the rear aperture assembly includes a rear frame with a top side extending between two longitudinal sides, wherein the rear frame further includes one or more molded brackets that provide support to a rear panel that forms an exterior surface of a rear side of the hardtop for the vehicle.

26. The hardtop for the vehicle of claim 25 wherein the one or more molded brackets serve as brackets for additional structures.

27. The hardtop for the vehicle of claim 22 further comprising a water trough that extends across the at least one roof panel, wherein the water trough is an integrated sloped low point in a surface of the at least two adjacent panels that directs water to a chute formed in the water trough.

28. The hardtop for the vehicle of claim 22 further comprising a water trough formed of a single piece molded component that is connected to the at least one roof panel at a lap joint.

* * * * *